United States Patent
He et al.

(10) Patent No.: US 10,778,474 B2
(45) Date of Patent: Sep. 15, 2020

(54) CHANNEL ESTIMATION METHOD, RELATED DEVICE, AND SYSTEM

(71) Applicant: HUAWEI TECHNOLOGIES CO., LTD., Shenzhen, Guangdong (CN)

(72) Inventors: Ning He, Shanghai (CN); Jiyu Ye, Shanghai (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 5 days.

(21) Appl. No.: 16/204,984

(22) Filed: Nov. 29, 2018

(65) Prior Publication Data

US 2019/0097844 A1   Mar. 28, 2019

Related U.S. Application Data

(63) Continuation of application No. PCT/CN2016/084301, filed on Jun. 1, 2016.

(51) Int. Cl.
*H04L 25/02* (2006.01)
*H04L 5/00* (2006.01)
(Continued)

(52) U.S. Cl.
CPC .......... *H04L 25/0224* (2013.01); *H04L 5/001* (2013.01); *H04L 5/005* (2013.01);
(Continued)

(58) Field of Classification Search
CPC ..... H04W 28/04; H04W 28/06; H04W 72/02; H04W 72/0412; H04L 25/02; H04L 25/0224
See application file for complete search history.

(56) References Cited

U.S. PATENT DOCUMENTS 8,897,131 B2   11/2014   Zee et al.
2010/0040001 A1*   2/2010   Montojo .............. H04W 72/04
370/329
(Continued)

FOREIGN PATENT DOCUMENTS

CN    102045865 A    5/2011
CN    102158874 A    8/2011
(Continued)

OTHER PUBLICATIONS

LG Electronics,"Further consideration on EPDCCH design",3GPP TSG RAN WG1 Meeting #71 R1-124987,New Orleans, USA, Nov. 12-16, 2012,total 2 pages.
(Continued)

*Primary Examiner* — Chi Ho A Lee
(74) *Attorney, Agent, or Firm* — Womble Bond Dickinson (US) LLP (57) ABSTRACT

A channel estimation method, a related device, and a system are described. A method for channel estimation may include determining when there is a damaged cell measurement reference signal (CRS) in a plurality of CRSs in target resource blocks (RBs), where the target RBs are RBs in compressed standard bandwidth. The method may also include performing, by a terminal, channel estimation by using an undamaged CRS instead of the damaged CRS in the plurality of CRSs. Based on the method, accuracy of channel estimation can be improved, and a problem of a relatively large error of a demodulation result of a data demodulation service performed based on the channel estimation result is resolved.

12 Claims, 6 Drawing Sheets

(51) Int. Cl.
*H04W 28/04* (2009.01)
*H04W 28/06* (2009.01)
*H04W 72/04* (2009.01)

(52) U.S. Cl.
CPC ............ *H04L 5/006* (2013.01); *H04L 5/0048* (2013.01); *H04W 28/04* (2013.01); *H04W 28/06* (2013.01); *H04W 72/0413* (2013.01); *H04L 5/0044* (2013.01)

(56) References Cited

U.S. PATENT DOCUMENTS

| | | | |
|---|---|---|---|
| 2012/0238310 A1 | 9/2012 | Xiao et al. | |
| 2012/0320778 A1 | 12/2012 | Lv et al. | |
| 2013/0114496 A1* | 5/2013 | Mazzarese | H04L 5/0023 370/312 |
| 2015/0023331 A1* | 1/2015 | You | H04L 5/0048 370/336 |
| 2015/0085793 A1 | 3/2015 | Luo et al. | |
| 2015/0237602 A1* | 8/2015 | Chae | H04W 72/042 370/329 |
| 2017/0064705 A1* | 3/2017 | Lee | H04L 1/0026 |
| 2017/0251493 A1* | 8/2017 | Zhang | H04L 27/2626 |
| 2017/0310524 A1* | 10/2017 | Davydov | H04W 52/242 |
| 2018/0288643 A1* | 10/2018 | Schmidt | H04W 24/10 |
| 2018/0302926 A1* | 10/2018 | Bhorkar | H04W 28/065 |
| 2018/0359123 A1* | 12/2018 | Kimura | H04L 25/03343 |
| 2019/0123840 A1* | 4/2019 | Siomina | H04W 24/00 |

FOREIGN PATENT DOCUMENTS

| | | |
|---|---|---|
| CN | 103095631 A | 5/2013 |
| CN | 103856974 A | 6/2014 |
| CN | 104348600 A | 2/2015 |
| CN | 105556887 A | 5/2016 |
| WO | 2010117240 A2 | 10/2010 |
| WO | 2011054148 A1 | 5/2011 |
| WO | 2012148244 A2 | 11/2012 |
| WO | 20161032381 A1 | 3/2016 |

OTHER PUBLICATIONS

Huawei, Hisilicon,"Further discussion on RCRS BW for additional carrier types",3GPP TSG-RAN WG4 Meeting #66bis R4-131118,Chicago, US, Apr. 15-19, 2013,total 11 pages.

* cited by examiner

CHANNEL ESTIMATION METHOD, RELATED DEVICE, AND SYSTEM

CROSS-REFERENCE TO RELATED APPLICATIONS

This application is a continuation of International Application No. PCT/CN2016/084301, filed on Jun. 1, 2016, the disclosure of which is hereby incorporated by reference in its entirety.

TECHNICAL FIELD

This application relates to the field of communications technologies, and in particular, to a channel estimation method, a related device, and a system.

BACKGROUND

A long term evolution (LTE) network supports six types of standard bandwidth: 1.4 MHz, 3 MHz, 5 MHz, 10 MHz, 15 MHz, and 20 MHz. A global system for mobile communications (GSM)/universal mobile telecommunications system (UMTS)/code division multiple access (CDMA) network cannot satisfy requirements of intelligent terminals on massive voice and data services. Therefore, the intelligent terminals rapidly migrate towards an LTE network, and consequently, load of the GSM/UMTS/CDMA network is gradually reduced and load of the LTE network is gradually increased. To properly configure resources, operators try to release spectrums originally used for the GSM/UMTS/CDMA network, so that the spectrums are used for the LTE network, to improve spectral efficiency and a data throughput. Bandwidth of GSM/UMTS/CDMA is not standard bandwidth of the LTE network. Therefore, use of non-standard bandwidth becomes an important application scenario of LTE.

Figure 1:
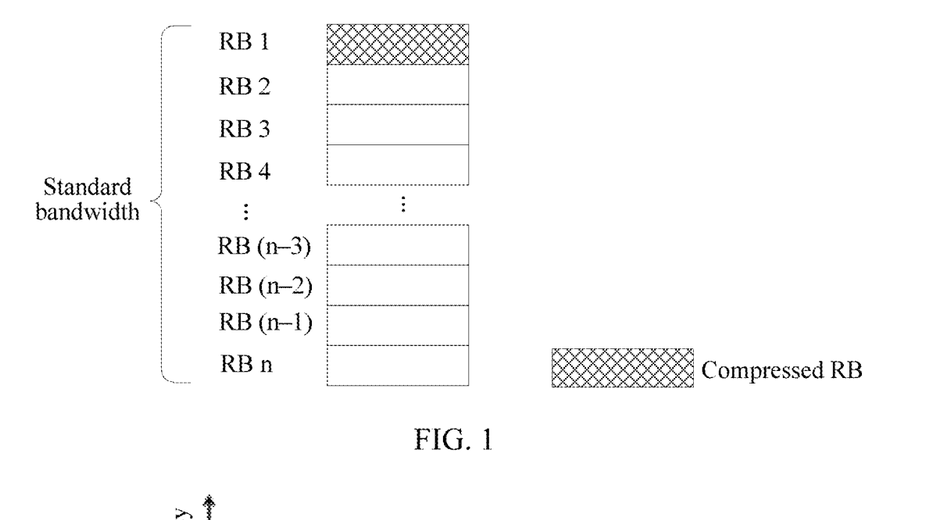
FIG. 1 is a schematic diagram of a scenario of compressing standard bandwidth in the prior art.
Figure 2:
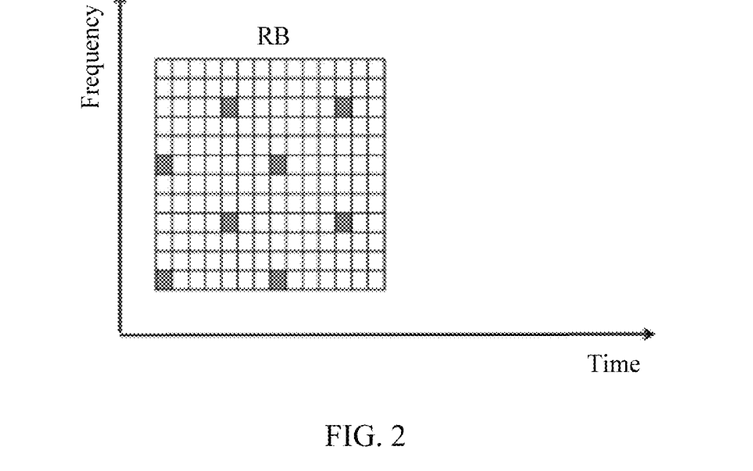
FIG. 2 is a schematic diagram of a scenario in which an RB includes a CRS in the prior art.

In some application scenarios of non-standard bandwidth, in the LTE network, the foregoing standard bandwidth needs to be compressed into non-standard bandwidth to use. Consequently, some resource blocks (RB) in the standard bandwidth are lost due to compression. As shown in FIG. 1, standard bandwidth before compression includes an RB 1, an RB 2, an RB 3, . . . , an RB (n−1), and an RB n, and the standard bandwidth after compression includes the RB 2, the RB 3, . . . , the RB (n−1), and the RB n. A structure of an RB is shown in FIG. 2, there is one CRS at an interval of every six subcarriers in a frequency domain, and there is one CRS at an interval of every three symbols in a time domain. If some RBs are lost due to compression, CRSs in the RBs are damaged. A channel estimation mechanism in the prior art is: A base station schedules an RB for a terminal. The terminal selects another RB from standard bandwidth to which the scheduled RB (an RB currently scheduled to the terminal) belongs, and then performs channel estimation by using a CRS in the scheduled RB and a CRS in the another RB.

A disadvantage in the prior art is that if a base station schedules, to a terminal, an RB (also referred to as a "compressed RB") in non-standard bandwidth obtained through compression on standard bandwidth, the terminal may determine a range that is of the standard bandwidth and within which the compressed RB falls, then select another RB from the standard bandwidth, and perform channel estimation based on a CRS in the compressed RB and a CRS in the another RB. If the another RB selected from the standard bandwidth is an RB lost due to compression, a channel estimation result of the terminal is inaccurate, and consequently, a demodulation result of a data demodulation service performed based on the channel estimation result has a relatively large error.

SUMMARY

Embodiments of the present invention disclose a channel estimation method, a related device, and a system, to improve accuracy of channel estimation, and resolve a problem of a relatively large error of a demodulation result of a data demodulation service performed based on a channel estimation result.

A first aspect of the embodiments of the present invention discloses a channel estimation method. The method includes:

in a case in which there is a damaged CRS in a plurality of cell measurement reference signals CRSs in target resource blocks RBs, where the target RBs are RBs in compressed standard bandwidth, performing, by a terminal, channel estimation by using an undamaged CRS instead of the damaged CRS in the plurality of CRSs. Optionally, a process of processing standard bandwidth to cause a width of the standard bandwidth to become smaller is a process of compressing the standard bandwidth.

By performing the foregoing operation, the terminal determines whether there is a damaged CRS in the target RBs; and if there is a damaged CRS, performs channel estimation by using a CRS other than the damaged CRS in the target RBs, to avoid a relatively large error of a channel estimation result due to that the standard bandwidth is compressed, thereby reducing a deviation of a data demodulation service performed based on the channel estimation result.

With reference to the first aspect, in a first possible embodiment of the first aspect, the case in which there is a damaged CRS in a plurality of cell measurement reference signals CRSs in target resource blocks RBs includes:

receiving CRS damage indication information sent by a base station, where the CRS damage indication information indicates a CRS damaged after the base station compresses the standard bandwidth; and learning, according to the CRS damage indication information, whether there is a damaged CRS in the plurality of CRSs in the target RBs.

With reference to the first aspect, in a second possible embodiment of the first aspect, the case in which there is a damaged CRS in a plurality of cell measurement reference signals CRSs in target resource blocks RBs includes:

dividing the target RBs into a plurality of groups, where each group includes at least one RB;

performing channel estimation by using CRSs in each of the plurality of groups; and when channel quality estimated by using CRSs in a first group in the plurality of groups is lower than a preset threshold of channel quality estimated by using CRSs in a second group in the plurality of groups, determining that the CRSs in the first group are damaged and the CRSs in the second group are not damaged, where the first group and the second group are any two of the plurality of groups.

With reference to the first aspect, in a third possible embodiment of the first aspect, the case in which there is a damaged CRS in a plurality of cell measurement reference signals CRSs in target resource blocks RBs includes:

performing channel estimation by using the plurality of CRSs in the target RBs, where if estimated channel quality is lower than a preset threshold, it indicates that there is a damaged CRS in the plurality of CRSs, and CRSs in an RB currently allocated to the terminal are undamaged CRSs.

With reference to the first aspect, the first possible embodiment of the first aspect, the second possible embodiment of the first aspect, or the third possible embodiment of the first aspect, in a fourth possible embodiment of the first aspect, the standard bandwidth is bandwidth of a secondary cell.

That is, a primary cell is more important than the secondary cell. Therefore, the standard bandwidth of the secondary cell is compressed, and bandwidth of the primary cell is not compressed, thereby avoiding impact of the compressed bandwidth on the primary cell.

With reference to the fourth possible embodiment of the first aspect, in a fifth possible embodiment of the first aspect, before the performing, by a terminal, channel estimation by using an undamaged CRS instead of the damaged CRS in the plurality of CRSs, the method further includes:

receiving, by the terminal, a resource indication message sent by the base station in a cross-carrier scheduling manner by using a physical downlink control channel PDCCH of a primary cell, where the resource indication message is used to schedule an RB in the secondary cell for the terminal to transmit data.

According to a second aspect, an embodiment of the present invention provides a resource scheduling method. The method includes:

compressing, by a base station, standard bandwidth of a secondary cell, to obtain compressed bandwidth; and sending, by the base station, a resource indication message to a terminal in a cross-carrier scheduling manner by using a physical downlink control channel PDCCH of a primary cell, to instruct the terminal to transmit data by using a resource block RB in the compressed bandwidth.

The foregoing operations are performed, so that after compressing the standard bandwidth of the secondary cell to obtain the compressed bandwidth, the base station does not send the resource indication message by using a PDCCH of the secondary cell but schedules an RB in the compressed bandwidth of the secondary cell for the terminal in the cross-carrier scheduling manner by using the primary cell, thereby avoiding unsuccessful scheduling of an RB resource due to that a PDCCH of a compressed RB is used.

With reference to the second aspect, in a first possible embodiment of the second aspect, the resource indication message is further used to indicate cell measurement reference signals CRSs of an RB lost in a process of compressing the standard bandwidth, and the terminal is configured to perform channel estimation by using a CRS other than the CRSs of the lost RB in the standard bandwidth.

According to a third aspect, an embodiment of the present invention provides a terminal. The terminal includes a processor, a memory, and a transceiver, and the processor invokes a program in the memory to perform the following operation:

in a case in which there is a damaged CRS in a plurality of cell measurement reference signals CRSs in target resource blocks RBs, where the target RBs are RBs in compressed standard bandwidth, performing channel estimation by using the transceiver and an undamaged CRS instead of the damaged CRS in the plurality of CRSs.

By performing the foregoing operation, the terminal determines whether there is a damaged CRS in the target RBs; and if there is a damaged CRS, performs channel estimation by using a CRS other than the damaged CRS in the target RBs, to avoid a relatively large error of a channel estimation result due to that the standard bandwidth is compressed, thereby reducing a deviation of a data demodulation service performed based on the channel estimation result.

With reference to the third aspect, in a first possible embodiment of the third aspect, the case in which there is a damaged CRS in a plurality of cell measurement reference signals CRSs in target resource blocks RBs is specifically:

receiving, by using the transceiver, CRS damage indication information sent by a base station, where the CRS damage indication information indicates a CRS damaged after the base station compresses the standard bandwidth; and learning, according to the CRS damage indication information, whether there is a damaged CRS in the plurality of CRSs in the target RBs.

With reference to the third aspect, in a second possible embodiment of the third aspect, the case in which there is a damaged CRS in a plurality of cell measurement reference signals CRSs in target resource blocks RBs is specifically:

dividing the target RBs into a plurality of groups, where each group includes at least one RB;

performing channel estimation by using the transceiver and CRSs in each of the plurality of groups; and when channel quality estimated by using CRSs in a first group in the plurality of groups is lower than a preset threshold of channel quality estimated by using CRSs in a second group in the plurality of groups, determining that the CRSs in the first group are damaged and the CRSs in the second group are not damaged, where the first group and the second group are any two of the plurality of groups.

With reference to the third aspect, in a third possible embodiment of the third aspect, the case in which there is a damaged CRS in a plurality of cell measurement reference signals CRSs in target resource blocks RBs is specifically:

performing channel estimation by using the transceiver and the plurality of CRSs in the target RBs, where if estimated channel quality is lower than a preset threshold, it indicates that there is a damaged CRS in the plurality of CRSs, and CRSs in an RB currently allocated to the terminal are undamaged CRSs.

With reference to the second aspect, the first possible embodiment of the second aspect, the second possible embodiment of the second aspect, or the third possible embodiment of the second aspect, in a fourth possible embodiment of the second aspect, the standard bandwidth is bandwidth of a secondary cell.

That is, a primary cell is more important than the secondary cell. Therefore, the standard bandwidth of the secondary cell is compressed, and bandwidth of the primary cell is not compressed, thereby avoiding impact of the compressed bandwidth on the primary cell.

With reference to the fourth possible embodiment of the second aspect, in a fifth possible embodiment of the second aspect, before the processor performs channel estimation by using the transceiver and the undamaged CRS instead of the damaged CRS in the plurality of CRSs, the processor is further configured to receive, by using the transceiver, a resource indication message sent in a cross-carrier scheduling manner by using a physical downlink control channel PDCCH of a primary cell, where the resource indication message is used to schedule an RB in the secondary cell for the terminal to transmit data.

According to a fourth aspect, an embodiment of the present invention provides a base station. The base station includes a processor, a memory, and a transceiver, and the processor invokes a program in the memory to perform the following operations:

compressing standard bandwidth of a secondary cell, to obtain compressed bandwidth; and sending a resource indication message to a terminal in a cross-carrier scheduling manner by using the transceiver and a physical downlink control channel PDCCH of a primary cell, to instruct the terminal to transmit data by using a resource block RB in the compressed bandwidth.

The foregoing operations are performed, so that after compressing the standard bandwidth of the secondary cell to obtain the compressed bandwidth, the base station does not send the resource indication message by using a PDCCH of the secondary cell but schedules an RB in the compressed bandwidth of the secondary cell for the terminal in the cross-carrier scheduling manner by using the primary cell, thereby avoiding unsuccessful scheduling of an RB resource due to that a PDCCH of a compressed RB is used.

With reference to the fourth aspect, in a possible embodiment of the fourth aspect, the resource indication message is further used to indicate cell measurement reference signals CRSs of an RB lost in a process of compressing the standard bandwidth, and the terminal is configured to perform channel estimation by using a CRS other than the CRSs of the lost RB in the standard bandwidth.

According to a fifth aspect, an embodiment of the present invention provides a terminal. The terminal includes functional units configured to perform some or all steps according to any implementation of the first aspect.

According to a sixth aspect, an embodiment of the present invention provides a base station. The base station includes functional units configured to perform some or all steps according to any implementation of the second aspect.

According to a seventh aspect, an embodiment of the present invention provides a system chip (for example, an SOC (System-on-a-Chip) chip). The system chip includes at least one processor and a memory. The processor and the memory may be connected by using a bus. The processor may invoke a program in the memory to perform the method described in any implementation of the first aspect.

According to an eighth aspect, an embodiment of the present invention provides a system chip (for example, an SOC chip). The system chip includes at least one processor, a memory, and a communications interface. The processor and the memory may be connected by using a bus. The processor may invoke a program in the memory to perform the method described in any implementation of the second aspect.

According to a ninth aspect, the present invention provides a computer-readable storage medium. The computer-readable storage medium stores one or more computer programs. An electronic device runs the one or more computer programs to perform the channel estimation method according to the first aspect.

According to a tenth aspect, the present invention provides a computer-readable storage medium. The computer-readable storage medium stores one or more computer programs. An electronic device runs the one or more computer programs to perform the resource scheduling method according to the second aspect.

According to an eleventh aspect, an embodiment of the present invention provides a communications system. The communications system includes a terminal and a base station. The terminal is the terminal described in the third aspect or the fifth aspect. The base station is the base station described in the fourth aspect or the sixth aspect.

According to a twelfth aspect, an embodiment of the present invention provides a communications system. The communications system includes a terminal and a base station. The terminal is the terminal described in the third aspect or the fifth aspect. The base station is configured to schedule the terminal.

According to a thirteenth aspect, an embodiment of the present invention provides a communications system. The communications system includes a terminal and a base station. The base station is the base station described in the fourth aspect or the sixth aspect. The terminal is scheduled by the base station.

The embodiments of the present invention are implemented, so that the terminal determines whether there is a damaged CRS in the target RBs; and if there is a damaged CRS, performs channel estimation by using a CRS other than the damaged CRS in the target RBs, to avoid a relatively large error of a channel estimation result due to that the standard bandwidth is compressed, thereby reducing a deviation of a data demodulation service performed based on the channel estimation result.

BRIEF DESCRIPTION OF DRAWINGS

To describe the technical solutions in the embodiments of the present invention more clearly, the following briefly describes the accompanying drawings required for the embodiments.

DESCRIPTION OF EMBODIMENTS

The technical solutions according to embodiments of the present invention described in the following with reference to the accompanying drawings.

A terminal described in the embodiments of the present invention may be a terminal device, for example, a mobile phone, a tablet computer, a notebook computer, a palmtop computer, a mobile Internet device (MID), or a wearable device (for example, a smartwatch, a smart band, or a pedometer), that can communicate with a base station. A base station described in the present invention may be a device, for example, an evolved NodeB (eNB) in LTE or a transmission/reception point (TRP) in NR, that can schedule the foregoing terminal.

Figure 3:
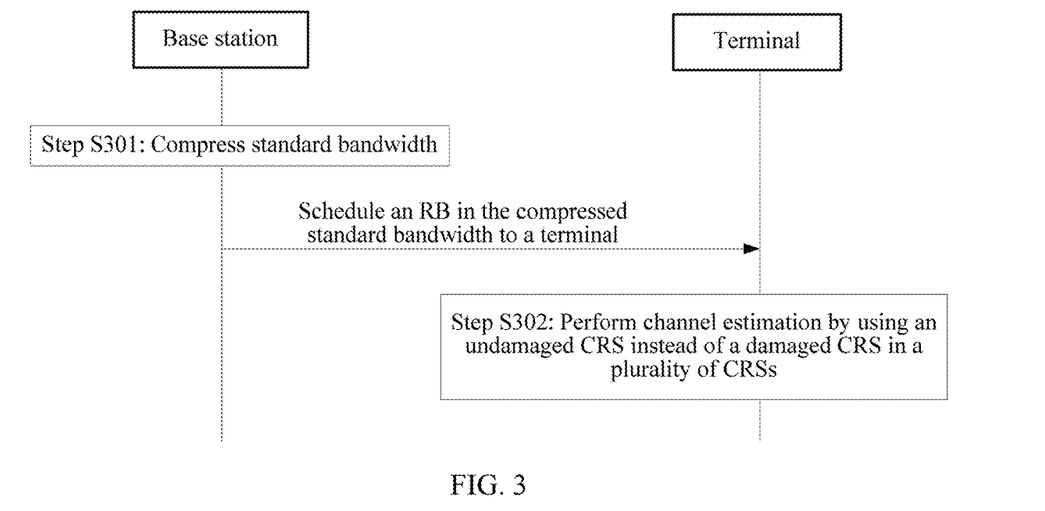
FIG. 3 is a schematic flowchart of a channel estimation method according to an embodiment of the present invention.

Referring to FIG. 3, FIG. 3 is a schematic flowchart of a channel estimation method according to an embodiment of the present invention. The method includes, but is not limited to, the following steps.

Step S301: A base station compresses standard bandwidth.

Specifically, the base station may compress standard bandwidth of 1.4 MHz, 3 MHz, 5 MHz, 10 MHz, 15 MHz, 20 MHz, and the like to obtain compressed bandwidth. A process of processing standard bandwidth to cause a width of the standard bandwidth to become smaller is a process of compressing the standard bandwidth. For example, standard bandwidth of 10 MHz is compressed to obtain compressed bandwidth of 9 MHz. The compressed bandwidth may be used for data transmission as the standard bandwidth. A total quantity of resource blocks RBs that may be used for data transmission in standard bandwidth before compression is greater than a total quantity of resource blocks RBs that may be used for data transmission in the standard bandwidth after compression, that is, standard bandwidth losses some RBs after being compressed. For example, there are six RBs in total in the standard bandwidth, and there are five RBs in total in the standard bandwidth after compression. The six RBs in the standard bandwidth are an RB 1, an RB 2, an RB 3, an RB 4, an RB 5, and an RB 6, and the five RBs in the standard bandwidth after compression are the RB 1, the RB 2, the RB 3, the RB 4, and the RB 5. The five RBs have a one-to-one correspondence with the former five RBs in the six RBs.

Step S302: In a case in which there is a damaged CRS in a plurality of cell measurement reference signals CRSs in target resource blocks RBs, a terminal performs channel estimation by using an undamaged CRS instead of the damaged CRS in the plurality of CRSs.

Specifically, the target RBs are RBs that are in the standard bandwidth and that may be used when the terminal performs channel estimation. Therefore, the terminal needs to determine whether the CRSs in the target RBs are damaged. For example, the standard bandwidth includes an RB 1, an RB 2, an RB 3, an RB 4, an RB 5, and an RB 6, and the target RBs are the RB 5 and the RB 6. If the RB 6 is lost due to compression when the base station compresses the standard bandwidth, CRSs that are in the CRSs in the target RBs and that are located in the RB 6 are damaged, and CRSs that are in the plurality of CRSs in the target RBs and that are located in the RB 5 are not damaged.

Determining whether there is a damaged CRS in the plurality of cell measurement reference signals CRSs in the target resource blocks RBs includes, but is not limited to, the following several cases:

First case: The terminal receives CRS damage indication information sent by the base station, and the CRS damage indication information indicates a CRS damaged after the base station compresses the standard bandwidth. The terminal further determines, according to the CRS damage indication information, whether there is a damaged CRS in the plurality of CRSs in the target RBs.

That is, the base station indicates, by using the CRS damage indication information, an RB whose CRS is damaged in the standard bandwidth. After learning of a CRS damaged in the standard bandwidth, the terminal determines whether the CRSs in the target RBs include the damaged CRS indicated by the CRS damage indication information. If the CRSs in the target RBs include the damaged CRS indicated by the CRS damage indication information, it indicates that there is a damaged CRS in the plurality of CRSs in the target RBs. If the CRSs in the target RBs do not include the damaged CRS indicated by the CRS damage indication information, it indicates that there is no damaged CRS in the plurality of CRSs in the target RBs.

Second case: The terminal divides the target RBs into a plurality of groups. For example, if the target RBs include an RB 1, an RB 2, an RB 3, and an RB 4, the RB 1 and the RB 2 may be divided into one group, the RB 3 and the RB 4 are divided into one group, and there are two groups in total. Alternatively, each of the RB 1, the RB 2, the RB 3, and the RB 4 is one group, and there are four groups in total. The plurality of groups include a first group and a second group. Then, channel estimation is performed by using CRSs in each of the plurality of groups. If channel quality estimated by using CRSs in the first group is lower than a preset threshold of channel quality estimated by using CRSs in the second group, it is considered that an RB in the first group is a compressed RB, the CRSs in the first group are damaged, and it is considered that the CRSs in the second group are not damaged. That is, when channel quality estimated by using a CRS in a group is lower than channel quality estimated by using CRSs in another group, and a quantity by which the channel quality estimated by using the CRS in the group is lower than the channel quality estimated by using the CRS in the another group exceeds a preset threshold, it is considered that the CRSs in the group are damaged CRSs.

Figure 4:
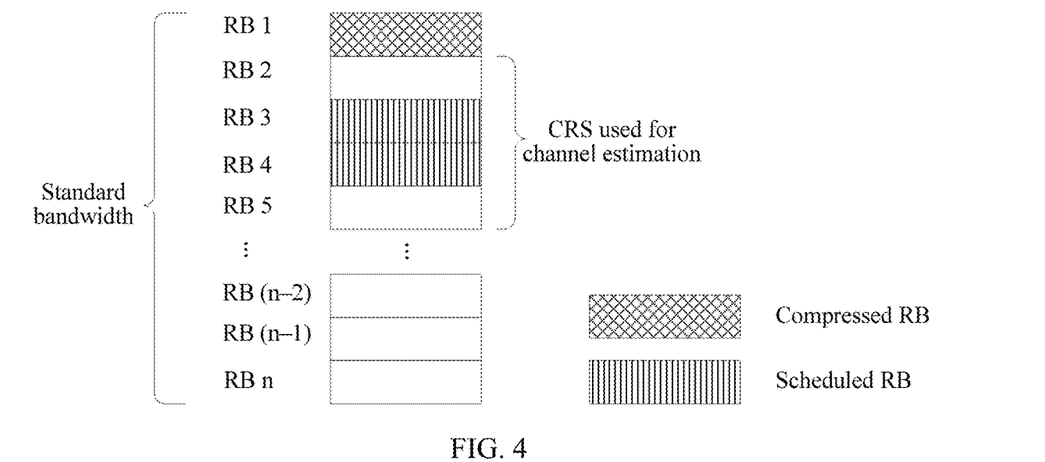
FIG. 4 is a schematic diagram of a scenario of selecting a CRS for performing channel estimation according to an embodiment of the present invention.

In the first case, a plurality of RBs may be selected, according to a preset rule, from the target RBs other than an RB in which the damaged CRS is located, and the plurality of RBs include a scheduled RB (the scheduled RB being an RB currently scheduled to the terminal to transmit data). CRSs in the plurality of RBs are determined as undamaged CRSs, and then channel estimation is performed by using the undamaged CRSs. For example, the CRS damage indication information indicates that CRSs in an RB 1 in FIG. 4 are damaged, scheduled RBs include an RB 3 and an RB 4, and the RB 3, the RB 4, and the RB 1 belong to same standard bandwidth. Therefore, CRSs in an RB 2, the RB 3, the RB 4, and an RB 5 may be determined as undamaged CRSs for channel estimation.

In an optional solution in the second case, the CRSs in the second group may be used as undamaged CRSs.

Figure 5:
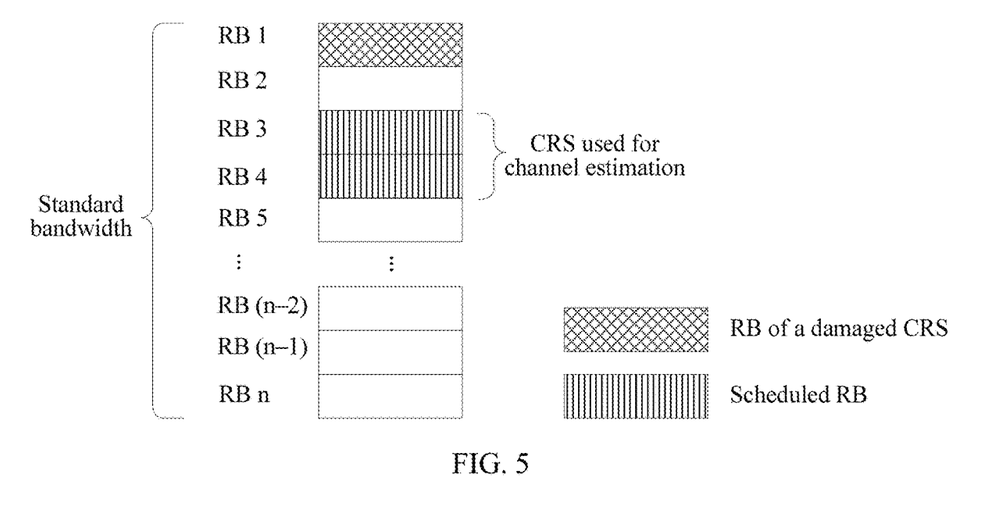
FIG. 5 is a schematic diagram of another scenario of selecting a CRS for performing channel estimation according to an embodiment of the present invention.

In another optional solution in the second case, the terminal may determine CRSs in a scheduled RB as undamaged CRSs. The base station does not allocate, to the terminal, an RB that is lost due to compression, and if the base station allocates an RB to the terminal, it indicates that the RB is not lost due to compression. Therefore, CRSs in the RB may be determined as undamaged CRSs, and then channel estimation is performed by using the undamaged CRSs. For example, as shown in FIG. 5, if an RB 3 and an RB 4 are RBs currently scheduled to the terminal, CRSs in the RB 3 and the RB 4 may be used as undamaged CRSs.

In an optional solution, when standard bandwidth of a secondary cell is compressed and standard bandwidth of a primary cell is not compressed in step S301, steps S304 and S305 may be performed before step S301. Detailed descriptions of steps S304 and S305 are as follows:

Step S304: The base station sends a resource indication message to the terminal in a cross-carrier scheduling manner by using a physical downlink control channel (PDCCH) of a primary cell.

Figure 6:
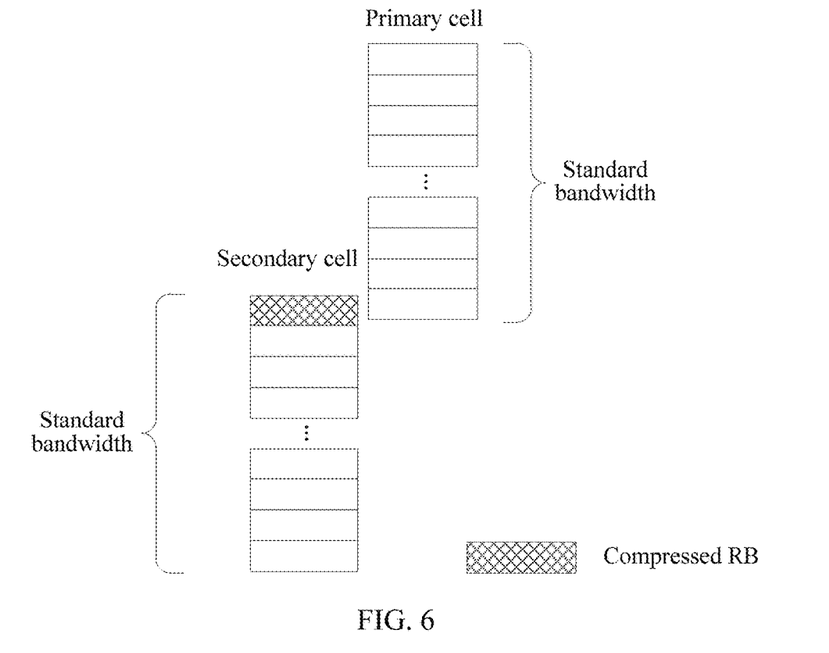
FIG. 6 is a schematic diagram of a scenario of compressing standard bandwidth of a secondary cell according to an embodiment of the present invention.

Specifically, the base station transmits data by using a manner of joint-scheduling between the primary cell and the secondary cell. The compressed standard bandwidth is bandwidth in the secondary cell rather than bandwidth in the primary cell, that is, the base station does not compress the standard bandwidth of the primary cell. As shown in FIG. 6, there is no compressed RB in the primary cell, and there is a compressed RB in the secondary cell.

Step S305: The terminal receives the resource indication message sent by the base station in the cross-carrier scheduling manner by using the PDCCH of the primary cell.

Specifically, when the base station compresses the standard bandwidth of the secondary cell, a part of a PDCCH may be damaged. Therefore, the base station does not send the resource indication message by using the PDCCH of the secondary cell but sends the resource indication message through the cross-carrier joint-scheduling manner by using the PDCCH of the primary cell. The resource indication message is used to indicate, to the terminal, an RB that is of the secondary cell and on which the terminal transmits data.

In the method shown in FIG. 3, the terminal determines whether there is a damaged CRS in the target RBs; and if there is a damaged CRS, performs channel estimation by using a CRS other than the damaged CRS in the target RBs, to avoid a relatively large error of a channel estimation result due to that the standard bandwidth is compressed, thereby reducing a deviation of a data demodulation service performed based on the channel estimation result.

Figure 7:
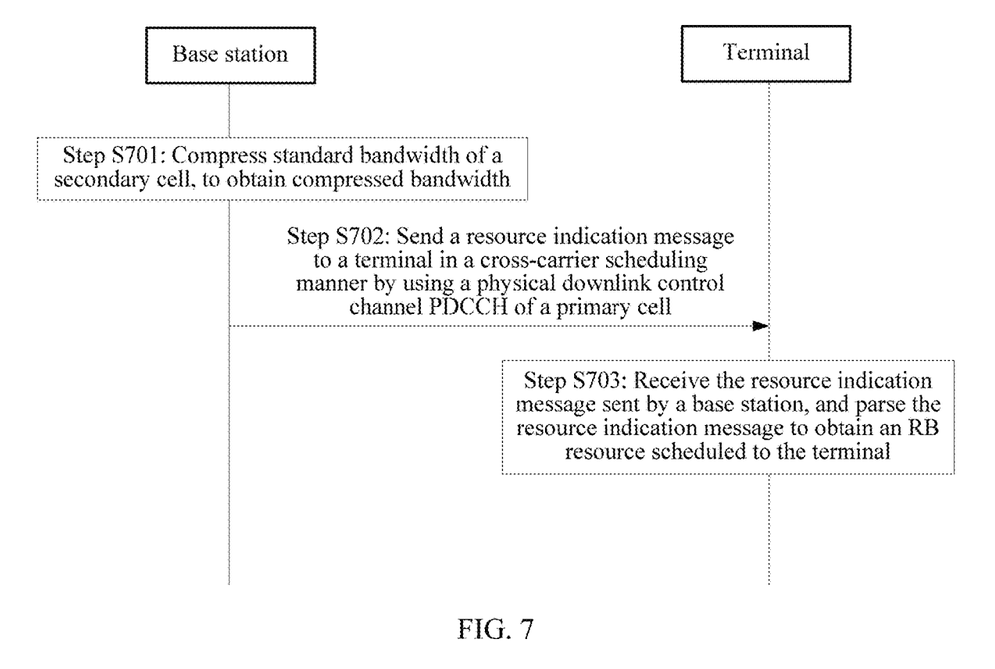
FIG. 7 is a schematic flowchart of a resource scheduling method according to an embodiment of the present invention.

Referring to FIG. 7, FIG. 7 is a schematic flowchart of a resource scheduling method according to an embodiment of the present invention. The method includes, but is not limited to, the following steps.

Step S701: A base station compresses standard bandwidth of a secondary cell, to obtain compressed bandwidth.

Specifically, the base station transmits data by using a manner of joint-scheduling between a primary cell and the secondary cell. The compressed standard bandwidth is bandwidth in the secondary cell rather than bandwidth in the primary cell, that is, the base station does not compress standard bandwidth of the primary cell. As shown in FIG. 6, there is no compressed RB in the primary cell, and there is a compressed RB in the secondary cell.

The base station may compress standard bandwidth of 1.4 MHz, 3 MHz, 5 MHz, 10 MHz, 15 MHz, 20 MHz, and the like to obtain compressed bandwidth. For example, standard bandwidth of 10 MHz is compressed to obtain compressed bandwidth of 9 MHz. The compressed bandwidth may be used for data transmission as the standard bandwidth. A total quantity of resource blocks RBs that may be used for data transmission in standard bandwidth before compression is greater than a total quantity of resource blocks RBs that may be used for data transmission in the standard bandwidth after compression, that is, standard bandwidth losses some RBs after being compressed. For example, there are six RBs in total in the standard bandwidth, and there are five RBs in total in the standard bandwidth after compression. The six RBs in the standard bandwidth are an RB 1, an RB 2, an RB 3, an RB 4, an RB 5, and an RB 6, and the five RBs in the standard bandwidth after compression are the RB 1, the RB 2, the RB 3, the RB 4, and the RB 5. The five RBs have a one-to-one correspondence with the former five RBs in the six RBs.

Step S702: The base station sends a resource indication message to a terminal in a cross-carrier scheduling manner by using a physical downlink control channel PDCCH of a primary cell, to instruct the terminal to transmit data by using a resource block RB in the compressed bandwidth.

Specifically, when the base station compresses the standard bandwidth of the secondary cell, a part of a PDCCH may be damaged. Therefore, the base station does not send the resource indication message by using the PDCCH of the secondary cell but sends the resource indication message through the cross-carrier joint-scheduling manner by using the PDCCH of the primary cell. The resource indication message is used to indicate, to the terminal, an RB that is of the secondary cell and on which the terminal transmits the data.

Step S703: The terminal receives the resource indication message sent by the base station, and parses the resource indication message to obtain an RB resource scheduled to the terminal.

Specifically, for ease of description, the RB resource scheduled to the terminal may be referred to as a scheduled RB. When transmitting the data by using the scheduled RB, the terminal needs to perform channel estimation by using an undamaged CRS.

In an optional solution, the terminal needs to determine an RB that is in the standard bandwidth and whose CRS is not damaged, and then perform, after determining the undamaged CRS, channel estimation based on the CRS. For a specific process, refer to steps S301 to S303 in the embodiment shown in FIG. 3, and details are not described herein again.

In the method shown in FIG. 7, after compressing the standard bandwidth of the secondary cell to obtain the compressed bandwidth, the base station does not send the resource indication message by using the PDCCH of the secondary cell but schedules an RB in the compressed bandwidth of the secondary cell for the terminal in the cross-carrier scheduling manner by using the PDCCH of the primary cell, thereby avoiding unsuccessful scheduling of an RB resource due to that a PDCCH of a compressed RB is used.

The foregoing describes the methods in the embodiments of the present invention in detail. For ease of better implementing the foregoing solutions in the embodiments of the present invention, the following provides apparatuses in the embodiments of the present invention.

Figure 8:
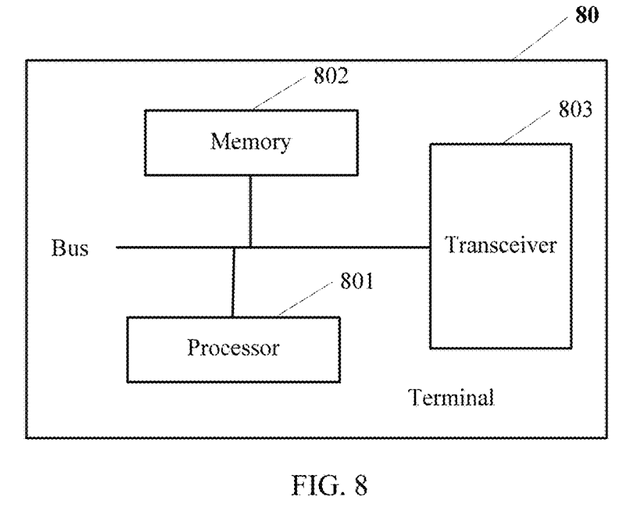
FIG. 8 is a schematic structural diagram of a terminal according to an embodiment of the present invention.

Referring to FIG. 8, FIG. 8 shows a terminal 80 according to an embodiment of the present invention. The terminal 80 includes a processor 801 (where there may be one or more processors 801, and one processor is used as an example in FIG. 8), a memory 802, and a transceiver 803 (which may include a radio frequency module, an antenna, and the like). In some embodiments of the present invention, the processor 801, the memory 802, and the transceiver 803 may be connected by using a bus or another manner. An example in which the processor 801, the memory 802, and the transceiver 803 are connected by using a bus is used in FIG. 8.

The memory 802 is configured to store a program.

The processor 801 invokes the program in the memory 802 to perform the following operation:

in a case in which there is a damaged CRS in a plurality of cell measurement reference signals CRSs in target resource blocks RBs, where the target RBs are RBs in compressed standard bandwidth, performing channel estimation by using the transceiver 803 and an undamaged CRS instead of the damaged CRS in the plurality of CRSs.

By performing the foregoing operation, the terminal 80 determines whether there is a damaged CRS in the target RBs; and if there is a damaged CRS, performs channel estimation by using a CRS other than the damaged CRS in the target RBs, to avoid a relatively large error of a channel estimation result due to that the standard bandwidth is compressed, thereby reducing a deviation of a data demodulation service performed based on the channel estimation result.

In an optional solution, the case in which there is a damaged CRS in a plurality of cell measurement reference signals CRSs in target resource blocks RBs is specifically:

receiving, by using the transceiver 803, CRS damage indication information sent by a base station, where the CRS damage indication information indicates a CRS damaged after the base station compresses the standard bandwidth; and learning, according to the CRS damage indication information, whether there is a damaged CRS in the plurality of CRSs in the target RBs.

In another optional solution, the case in which there is a damaged CRS in a plurality of cell measurement reference signals CRSs in target resource blocks RBs is specifically:

dividing the target RBs into a plurality of groups, where each group includes at least one RB;

performing channel estimation by using the transceiver 803 and CRSs in each of the plurality of groups; and when channel quality estimated by using CRSs in a first group in the plurality of groups is lower than a preset threshold of channel quality estimated by using CRSs in a second group in the plurality of groups, determining that the CRSs in the first group are damaged and the CRSs in the second group are not damaged, where the first group and the second group are any two of the plurality of groups.

In still another optional solution, the case in which there is a damaged CRS in a plurality of cell measurement reference signals CRSs in target resource blocks RBs is specifically:

performing channel estimation by using the transceiver 803 and the plurality of CRSs in the target RBs, where if estimated channel quality is lower than a preset threshold, it indicates that there is a damaged CRS in the plurality of CRSs, and CRSs in an RB currently allocated to the terminal are undamaged CRSs.

In still another optional solution, the standard bandwidth is bandwidth of a secondary cell.

That is, a primary cell is more important than the secondary cell. Therefore, the standard bandwidth of the secondary cell is compressed, and bandwidth of the primary cell is not compressed, thereby avoiding impact of the compressed bandwidth on the primary cell.

In still another optional solution, before the processor 801 performs channel estimation by using the transceiver 803 and the undamaged CRS instead of the damaged CRS in the plurality of CRSs, the processor 801 is further configured to receive, by using the transceiver 803, a resource indication message sent in a cross-carrier scheduling manner by using a physical downlink control channel PDCCH of a primary cell. The resource indication message is used to schedule an RB in the secondary cell for the terminal to transmit data.

It should be noted that for a specific implementation of the terminal 80 shown in FIG. 8, correspondingly refer to the implementation of the method embodiment shown in FIG. 3.

In the terminal 80 shown in FIG. 8, the terminal 80 determines whether there is a damaged CRS in the target RBs; and if there is a damaged CRS, performs channel estimation by using a CRS other than the damaged CRS in the target RBs, to avoid a relatively large error of a channel estimation result due to that the standard bandwidth is compressed, thereby reducing a deviation of a data demodulation service performed based on the channel estimation result.

Figure 9:
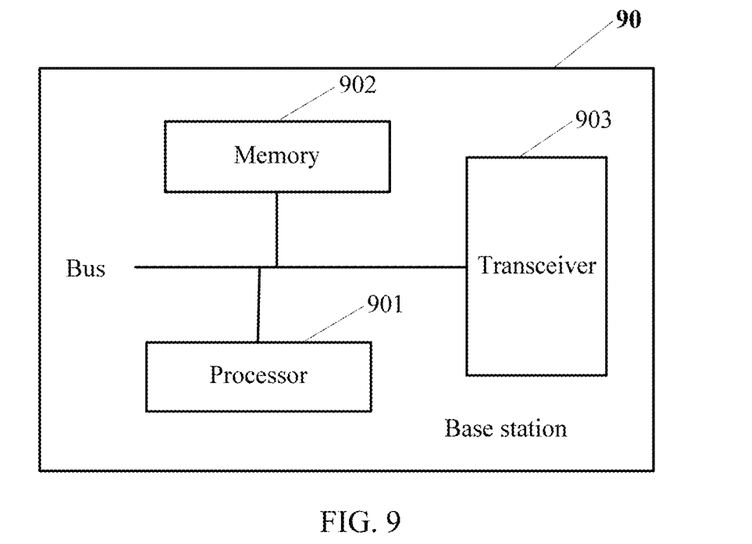
FIG. 9 is a schematic structural diagram of a base station according to an embodiment of the present invention.

Referring to FIG. 9, FIG. 9 shows a base station 90 according to an embodiment of the present invention. The base station 90 includes a processor 901 (where there may be one or more processors 901, and one processor is used as an example in FIG. 9), a memory 902, and a transceiver 903 (which may include a radio frequency module, an antenna, and the like). In some embodiments of the present invention, the processor 901, the memory 902, and the transceiver 903 may be connected by using a bus or another manner. An example in which the processor 801, the memory 802, and the transceiver 803 are connected by using a bus is used in FIG. 9.

The memory 902 is configured to store a program.

The processor 901 invokes the program in the memory 902 to perform the following operations:

compressing standard bandwidth of a secondary cell, to obtain compressed bandwidth; and sending a resource indication message to a terminal in a cross-carrier scheduling manner by using the transceiver 903 and a physical downlink control channel PDCCH of a primary cell, to instruct the terminal to transmit data by using a resource block RB in the compressed bandwidth.

In an optional solution, the resource indication message is further used to indicate cell measurement reference signals CRSs of an RB lost in a process of compressing the standard bandwidth, and the terminal is configured to perform channel estimation by using a CRS other than the CRSs of the lost RB in the standard bandwidth.

It should be noted that for a specific implementation of the base station 90 shown in FIG. 9, refer to the implementation of the method embodiment shown in FIG. 7.

In the base station 90 shown in FIG. 9, after compressing the standard bandwidth of the secondary cell to obtain the compressed bandwidth, the base station 90 does not send the resource indication message by using a PDCCH of the secondary cell but schedules an RB in the compressed bandwidth of the secondary cell for the terminal in the cross-carrier scheduling manner by using the primary cell, thereby avoiding unsuccessful scheduling of an RB resource due to that a PDCCH of a compressed RB is used.

Figure 10:
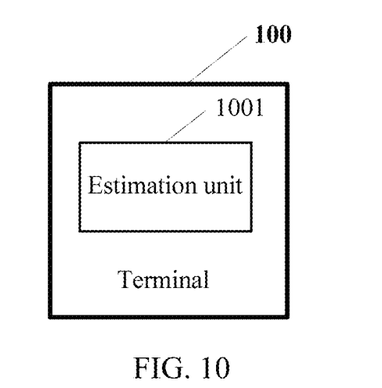
FIG. 10 is a schematic structural diagram of another terminal according to an embodiment of the present invention.

Referring to FIG. 10, FIG. 10 is a schematic structural diagram of another terminal 100 according to an embodiment of the present invention. The terminal 100 includes an estimation unit 1001. A detailed description of the estimation unit 1001 is as follows:

The estimation unit 1001 is configured to: in a case in which there is a damaged CRS in a plurality of cell measurement reference signals CRSs in target resource blocks RBs, where the target RBs are RBs in compressed standard bandwidth, perform channel estimation by using an undamaged CRS instead of the damaged CRS in the plurality of CRSs.

By running the foregoing unit, the terminal 100 determines whether there is a damaged CRS in the target RBs; and if there is a damaged CRS, performs channel estimation by using a CRS other than the damaged CRS in the target RBs, to avoid a relatively large error of a channel estimation result due to that the standard bandwidth is compressed, thereby reducing a deviation of a data demodulation service performed based on the channel estimation result.

In an optional solution, the terminal 100 further includes a receiving unit and a judgment unit.

The receiving unit is configured to receive CRS damage indication information sent by a base station, where the CRS damage indication information indicates a CRS damaged after the base station compresses the standard bandwidth.

The judgment unit is configured to learn, according to the CRS damage indication information, whether there is a damaged CRS in the plurality of CRSs in the target RBs.

In another optional solution, the terminal 100 further includes a division unit and a determining unit. Detailed descriptions of the units are as follows:

The division unit is configured to divide the target RBs into a plurality of groups, where each group includes at least one RB.

The estimation unit 1001 is further configured to perform channel estimation by using CRSs in each of the plurality of groups.

The determining unit is configured to: when channel quality estimated by using CRSs in a first group in the plurality of groups is lower than a preset threshold of channel quality estimated by using CRSs in a second group in the plurality of groups, determine that the CRSs in the first group are damaged and the CRSs in the second group are not damaged, where the first group and the second group are any two of the plurality of groups.

In still another optional solution, the estimation unit 1001 is further configured to perform channel estimation by using the plurality of CRSs in the target RBs. If estimated channel quality is lower than a preset threshold, it indicates that there is a damaged CRS in the plurality of CRSs, and CRSs in an RB currently allocated to the terminal are undamaged CRSs.

In still another optional solution, the standard bandwidth is bandwidth of a secondary cell.

That is, a primary cell is more important than the secondary cell. Therefore, the standard bandwidth of the secondary cell is compressed, and bandwidth of the primary cell is not compressed, thereby avoiding impact of the compressed bandwidth on the primary cell.

In still another optional solution, the receiving unit is further configured to receive a resource indication message sent by the base station in a cross-carrier scheduling manner by using a physical downlink control channel PDCCH of a primary cell. The resource indication message is used to schedule an RB in the secondary cell for the terminal to transmit data.

It should be noted that for a specific implementation of the terminal 100 shown in FIG. 10, refer to the implementation of the method embodiment shown in FIG. 3.

In the terminal 100 shown in FIG. 10, the terminal 100 determines whether there is a damaged CRS in the target RBs; and if there is a damaged CRS, performs channel estimation by using a CRS other than the damaged CRS in the target RBs, to avoid a relatively large error of a channel estimation result due to that the standard bandwidth is compressed, thereby reducing a deviation of a data demodulation service performed based on the channel estimation result.

Figure 11:
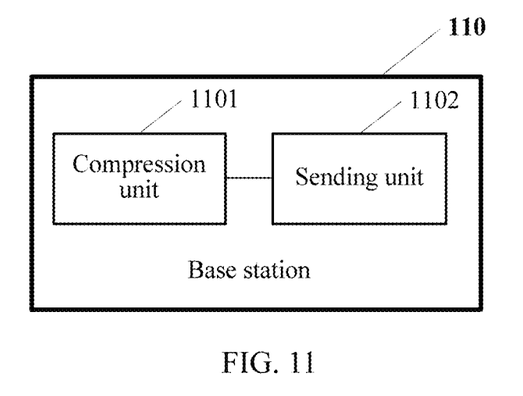
FIG. 11 is a schematic structural diagram of another base station according to an embodiment of the present invention.

Referring to FIG. 11, FIG. 11 shows a base station 110 according to an embodiment of the present invention. The base station 110 includes a compression unit 1101 and a sending unit 1102. Detailed descriptions of the units are as follows:

The compression unit 1101 is configured to compress standard bandwidth of a secondary cell, to obtain compressed bandwidth.

The sending unit 1102 is configured to send a resource indication message to a terminal in a cross-carrier scheduling manner by using a physical downlink control channel PDCCH of a primary cell, to instruct the terminal to transmit data by using a resource block RB in the compressed bandwidth.

In an optional solution, the resource indication message is further used to indicate cell measurement reference signals CRSs of an RB lost in a process of compressing the standard bandwidth, and the terminal is configured to perform channel estimation by using a CRS other than the CRSs of the lost RB in the standard bandwidth.

It should be noted that for a specific implementation of the base station 110 shown in FIG. 11, correspondingly refer to the implementation of the method embodiment shown in FIG. 7.

In the base station 110 shown in FIG. 11, after compressing the standard bandwidth of the secondary cell to obtain the compressed bandwidth, the base station does not send the resource indication message by using a PDCCH of the secondary cell but schedules an RB in the compressed bandwidth of the secondary cell for the terminal in the cross-carrier scheduling manner by using the primary cell, thereby avoiding unsuccessful scheduling of an RB resource due to that a PDCCH of a compressed RB is used.

Figure 12:
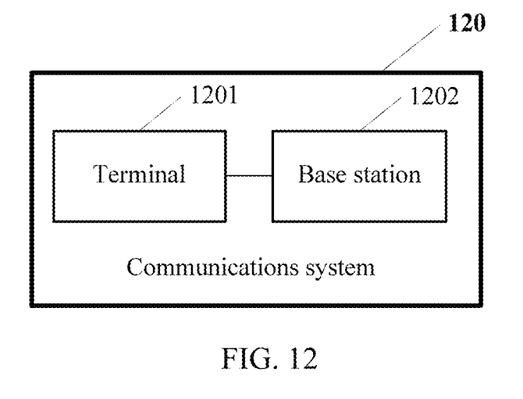
FIG. 12 is a schematic structural diagram of a communications system according to an embodiment of the present invention.

Referring to FIG. 12, FIG. 12 is a schematic structural diagram of a communications system 120 according to an embodiment of the present invention. The communications system 120 includes a terminal 1201 and a base station 1202. The terminal 1201 is the terminal 80 shown in FIG. 8 or the terminal 100 shown in FIG. 10. The base station 1202 is the base station 90 shown in FIG. 9 or the base station 110 shown in FIG. 11.

Further, an embodiment of the present invention provides a communications system. The communications system includes a base station. The base station is the base station 90 shown in FIG. 9 or the base station 110 shown in FIG. 11. The base station is configured to schedule another terminal device.

Further, an embodiment of the present invention provides a communications system. The communications system includes a terminal. The terminal is the terminal 80 shown in FIG. 8 or the terminal 100 shown in FIG. 10. The terminal is configured to transmit data under scheduling of a base station.

Further, an embodiment of the present invention provides a system chip (for example, an SOC (System-on-a-Chip) chip). The system chip includes at least one processor and a memory. The processor and the memory may be connected by using a bus. The processor is configured to perform an operation performed by the processor 801 shown in FIG. 8.

Further, an embodiment of the present invention provides a system chip (for example, an SOC chip). The system chip includes at least one processor, a memory, and a communications interface. The processor and the memory may be connected by using a bus. The processor is configured to perform an operation performed by the processor 901 shown in FIG. 9.

In conclusion, the embodiments of the present invention are implemented, so that the terminal determines whether there is a damaged CRS in the target RBs; and if there is a damaged CRS, performs channel estimation by using a CRS other than the damaged CRS in the target RBs, to avoid a relatively large error of a channel estimation result due to that the standard bandwidth is compressed, thereby reducing a deviation of a data demodulation service performed based on the channel estimation result.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium includes: a medium such as a ROM, a RAM, a disc, or a compact disc that can store program code.

The foregoing embodiments merely disclose preferred embodiments in the present invention and are not intended to limit the protection scope of the present invention. A person of ordinary skill in the art may understand that all or some procedures in the foregoing embodiments are implemented. In addition, equivalent variations made in accordance with the claims of the present invention shall fall within the scope of the present invention.

What is claimed is:

1. A channel estimation method, comprising:
   determining when there is a damaged cell measurement reference signal (CRS) in a plurality of CRSs in target resource blocks (RB)s, wherein the target RBs are RBs in compressed standard bandwidth, and wherein determining when there is the damaged CRS in the plurality of CRSs in target RBs comprises one or more of:
      (i) dividing, by the terminal, the target RBs into a plurality of groups, wherein each group comprises at least one RB,
      performing, by the terminal, channel estimation by using CRSs in each of the plurality of groups, and
      when channel quality estimated by using CRSs in a first group in the plurality of groups is lower than a preset threshold of channel quality estimated by using CRSs in a second group in the plurality of groups, determining that the CRSs in the first group are damaged and the CRSs in the second group are not damaged, wherein the first group and the second group are any two of the plurality of groups, and
      (ii) performing, by the terminal, channel estimation by using the plurality of CRSs in the target RBs, wherein estimated channel quality lower than a preset threshold indicates that there is a damaged CRS in the plurality of CRSs, and CRSs in an RB currently allocated to the terminal are undamaged CRSs; and
   performing, by a terminal, channel estimation by using an undamaged CRS instead of the damaged CRS in the plurality of CRSs.

2. The method according to claim 1, wherein determining when there is the damaged CRS in the plurality of CRSs in target RBs further comprises:
   receiving, by the terminal, CRS damage indication information sent by a base station, wherein the CRS damage indication information indicates a CRS damaged after the base station compresses the standard bandwidth; and
   learning, by the terminal, of the damaged CRS in the plurality of CRSs in the target RBs according to the CRS damage indication information.

3. The method according to claim 1, wherein the standard bandwidth is bandwidth of a secondary cell.

4. The method according to claim 3, wherein before the performing, by the terminal, channel estimation by using the undamaged CRS instead of the damaged CRS in the plurality of CRSs, the method further comprises:
   receiving, by the terminal, a resource indication message sent by the base station in a cross-carrier scheduling manner by using a physical downlink control channel (PDCCH) of a primary cell, wherein the resource indication message is used to schedule an RB in the secondary cell for the terminal to transmit data.

5. A resource scheduling method, comprising:
   compressing, by a base station, standard bandwidth of a secondary cell, to obtain compressed bandwidth; and
   sending, by the base station, a resource indication message to a terminal in a cross-carrier scheduling manner by using a physical downlink control channel (PDCCH) of a primary cell, to instruct the terminal to transmit data by using a resource block (RB) in the compressed bandwidth,
   wherein the resource indication message is further used to indicate cell measurement reference signals (CRS)s of a plurality of target RBs in the compressed bandwidth, and wherein the terminal is configured to determine when there is a damaged CRS in the CRSs in the target RBs by performing one or more of:
      (i) dividing the target RBs into a plurality of groups, wherein each group comprises at least one RB,
      performing channel estimation by using CRSs in each of the plurality of groups, and
      when channel quality estimated by using CRSs in a first group in the plurality of groups is lower than a preset threshold of channel quality estimated by using CRSs in a second group in the plurality of groups, determining that the CRSs in the first group are damaged and the CRSs in the second group are not damaged, wherein the first group and the second group are any two of the plurality of groups, and
      (ii) performing channel estimation by using the plurality of CRSs in the target RBs, wherein estimated channel quality lower than a preset threshold indicates that there is a damaged CRS in the plurality of CRSs, and CRSs in an RB currently allocated to the terminal are undamaged CRSs.

6. The method according to claim 5, wherein the resource indication message is further used to indicate cell measurement reference signals (CRS)s of an RB lost in a process of compressing the standard bandwidth, and the terminal is configured to perform channel estimation by using a CRS other than the CRSs of the lost RB in the standard bandwidth.

7. A terminal, wherein the terminal comprises a processor, a memory, and a transceiver, and the processor executes a program in the memory to perform operations comprising:
   determining when there is a damaged cell measurement reference signal (CRS) in a plurality of CRSs in target resource blocks RBs, wherein the target RBs are RBs in compressed standard bandwidth, and wherein determining when there is the damaged CRS in the plurality of CRSs in target RBs comprises one or more of:
      (i) dividing, by the terminal, the target RBs into a plurality of groups, wherein each group comprises at least one RB,
      performing, by the terminal, channel estimation by using CRSs in each of the plurality of groups, and
      when channel quality estimated by using CRSs in a first group in the plurality of groups is lower than a preset threshold of channel quality estimated by using CRSs in a second group in the plurality of groups, determining that the CRSs in the first group are damaged and the CRSs in the second group are not damaged, wherein the first group and the second group are any two of the plurality of groups, and
(ii) performing, by the terminal, channel estimation by using the plurality of CRSs in the target RBs, wherein estimated channel quality lower than a preset threshold indicates that there is a damaged CRS in the plurality of CRSs, and CRSs in an RB currently allocated to the terminal are undamaged CRSs; and performing channel estimation by using the transceiver and an undamaged CRS instead of the damaged CRS in the plurality of CRSs.

8. The terminal according to claim 7, wherein operations for determining when there is a damaged CRS in the plurality of CRSs in target resource blocks RBs further comprise:

receiving, by using the transceiver, CRS damage indication information sent by a base station, wherein the CRS damage indication information indicates a CRS damaged after the base station compresses the standard bandwidth; and learning, according to the CRS damage indication information, whether there is a damaged CRS in the plurality of CRSs in the target RBs.

9. The terminal according to claim 7, wherein the standard bandwidth is bandwidth of a secondary cell.

10. The terminal according to claim 9, wherein before the processor performs channel estimation by using the transceiver and the undamaged CRS instead of the damaged CRS in the plurality of CRSs, the processor is further configured to receive, by using the transceiver, a resource indication message sent in a cross-carrier scheduling manner by using a physical downlink control channel PDCCH of a primary cell, wherein the resource indication message is used to schedule an RB in the secondary cell for the terminal to transmit data.

11. A base station, wherein the base station comprises a processor, a memory, and a transceiver, and the processor executes a program in the memory to perform operations comprising:

compressing standard bandwidth of a secondary cell, to obtain compressed bandwidth; and sending a resource indication message to a terminal in a cross-carrier scheduling manner by using the transceiver and a physical downlink control channel (PDCCH) of a primary cell, to instruct the terminal to transmit data by using a resource block (RB) in the compressed bandwidth, wherein the resource indication message is further used to indicate cell measurement reference signals (CRS)s of a plurality of target RBs in the compressed bandwidth, and wherein the terminal is configured to determine when there is a damaged CRS in the CRSs in the target RBs by performing one or more of:

(i) dividing the target RBs into a plurality of groups, wherein each group comprises at least one RB, performing channel estimation by using CRSs in each of the plurality of groups, and when channel quality estimated by using CRSs in a first group in the plurality of groups is lower than a preset threshold of channel quality estimated by using CRSs in a second group in the plurality of groups, determining that the CRSs in the first group are damaged and the CRSs in the second group are not damaged, wherein the first group and the second group are any two of the plurality of groups, and (ii) performing channel estimation by using the plurality of CRSs in the target RBs, wherein estimated channel quality lower than a preset threshold indicates that there is a damaged CRS in the plurality of CRSs, and CRSs in an RB currently allocated to the terminal are undamaged CRSs.

12. The base station according to claim 11, wherein the resource indication message is further used to indicate cell measurement reference signals (CRS)s of an RB lost in a process of compressing the standard bandwidth, and the terminal is configured to perform channel estimation by using a CRS other than the CRSs of the lost RB in the standard bandwidth.

* * * * *